US010216234B2

(12) United States Patent
Liu

(10) Patent No.: US 10,216,234 B2
(45) Date of Patent: Feb. 26, 2019

(54) SECURING A TOUCH SENSOR ASSEMBLY FOR A TOUCH BUTTON WITHIN A DEVICE

(71) Applicant: TEXAS INSTRUMENTS INCORPORATED, Dalls, TX (US)

(72) Inventor: Dongtai Liu, Fremont, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2 days.

(21) Appl. No.: 15/632,297

(22) Filed: Jun. 23, 2017

(65) Prior Publication Data

US 2017/0371381 A1 Dec. 28, 2017

Related U.S. Application Data

(60) Provisional application No. 62/354,063, filed on Jun. 23, 2016.

(51) Int. Cl.
*G06F 3/041* (2006.01)
*G06F 1/16* (2006.01)
*G06F 3/046* (2006.01)
*G06F 3/044* (2006.01)

(52) U.S. Cl.
CPC .......... *G06F 1/1692* (2013.01); *G06F 1/1658* (2013.01); *G06F 3/041* (2013.01); *G06F 3/046* (2013.01); *G06F 3/044* (2013.01); *G06F 2203/04102* (2013.01)

(58) Field of Classification Search
CPC ...... G06F 1/1692; G06F 1/1658; G06F 3/041; G06F 3/046; G06F 2203/04102; G06F 2203/04103; G06F 3/044
See application file for complete search history.

(56) References Cited

U.S. PATENT DOCUMENTS

| 2011/0141026 A1* | 6/2011 | Joquet | H01H 13/703 345/168 |
| 2015/0212633 A1* | 7/2015 | Yamagishi | G06F 3/044 345/174 |
| 2017/0033442 A1* | 2/2017 | Choi | H01Q 1/243 |

* cited by examiner

*Primary Examiner* — Adam R. Giesy
(74) *Attorney, Agent, or Firm* — Andrew Viger; Charles A. Brill; Frank D. Cimino

(57) ABSTRACT

An apparatus to secure a touch sensor assembly for a device touch button (such as for a mobile communications device). A touch sensor slot IS integral with the device at the touch button area. A touch sensor assembly includes a touch flex sensor, and at least three alternating front-side and back-side flexible spacer elements attached to the touch flex sensor. The touch flex sensor can be secured within the touch sensor slot, and spaced from the front-side and back-side slot walls by respectively the front-side and back-side spacer elements. An elastic insulator material is introduced into the touch sensor slot surrounding the touch flex sensor. The sensor slot can be formed in a device wall, or formed by a touch sensor slot structure attached to the device at the touch button area, with an interior surface of the device forming a front-side wall of the touch sensor slot.

20 Claims, 4 Drawing Sheets

SECURING A TOUCH SENSOR ASSEMBLY FOR A TOUCH BUTTON WITHIN A DEVICE

CROSS-REFERENCE TO RELATED APPLICATIONS

Priority is claimed under 37 CFR 1.78 and 35 USC 119(e) to U.S. Provisional Application 62/354,063, filed 2016 Jun. 23), which is incorporated by reference.

BACKGROUND

Technical Field

This Patent Disclosure relates to touch input, such as touch buttons or keys, such as for use in personal computing/communication devices.

Related Art

Mobile/portable personal communications/computing devices commonly include physical/mechanical buttons integrated into a device case (such as on a side-wall edge). Such mechanical touch buttons are distinguished from, for example, capacitive touch buttons defined on a device screen.

Touch sensing technology can be used to replace these physical/mechanical buttons. Touch sensing can be used to detect touch-press of a touch button defined on a touch button surface, such as based on touch surface deflection/deformation. Touch sensing can be based on inductive sensing with an inductor coil sensor, or capacitive sensing with a capacitive electrode, disposed within the device case at the back-side of the touch button surface.

While this Background information references touch input for mobile/personal communication/computing devices, this Patent Disclosure is more generally directed to input button/keys based on touch technology.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for securing a touch sensor assembly for a touch button within a device, such as can be used in a mobile communications device.

According to aspects of the Disclosure, an apparatus for securing a touch sensor assembly for a touch button can be implemented in a device with at least one touch button defined on a touch button area of the device. The apparatus can include a touch sensor assembly, and a touch sensor slot integral with the device. The touch sensor assembly can include a touch flex sensor, and at least three alternating front-side and back-side spacer elements attached to the touch flex sensor, the spacer elements being flexible. The touch sensor slot can be formed integral with the device at the touch button area, including front-side and back-side slot walls, to position the touch sensor assembly relative to the touch button area. The touch flex sensor can be secured within the touch sensor slot, and spaced from the front-side and back-side slot walls by respectively the front-side and back-side spacer elements contacting respectively the front-side and back-side slot walls. An elastic insulator material introduced into the touch sensor slot surrounding the touch flex sensor.

According to other aspects of the Disclosure, an apparatus for securing a touch sensor assembly can be used in a device with at least one touch button defined on a touch button area of the device, the device including a touch sensor slot integral with the device case at an interior-side of the touch button area. The apparatus can include a touch sensor assembly including a touch flex sensor, and at least three alternating front-side and back-side spacer elements attached to the touch flex sensor, the spacer elements being flexible. The touch sensor assembly can be configured for positioning within the touch sensor slot, the spacer elements to secure the touch sensor assembly within the touch sensor slot, by the front-side and back-side spacer elements contacting respectively a front-side and a back-side slot wall of the touch sensor slot, the touch flex sensor spaced from the front-side and back-side slot walls by the spacer elements.

According to other aspects of the Disclosure, a device with at least one touch button defined on a touch button area of the device can include a touch button arrangement to secure a touch sensor assembly within the device case. The touch button arrangement can include a touch sensor assembly including a touch flex sensor, and at least three alternating front-side and back-side spacer elements attached to the touch flex sensor, the spacer elements being flexible. A touch sensor slot can be formed integral with the device case at the touch button area, including front-side and back-side slot walls, to position the touch sensor assembly relative to the touch button area. The touch flex sensor can be secured within the touch sensor slot, and spaced from the front-side and back-side slot walls by respectively the front-side and back-side spacer elements contacting respectively the front-side and back-side slot walls. An elastic insulator material introduced into the touch sensor slot surrounding the touch flex sensor.

Other aspects and features of the invention claimed in this Patent Document will be apparent to those skilled in the art from the following Disclosure.

BRIEF DESCRIPTION OF THE DRAWINGS

(FIG. 1) illustrates an example touch button arrangement in which the touch sensor assembly is secured within a touch sensor slot [15] formed in the device case [12]; and (FIG. 3) illustrates an example touch button arrangement in which the touch sensor assembly is secured with a touch sensor slot [25] in a touch sensor slot structure [24] integral with the device case [22].

(FIG. 2A) a touch sensor assembly [100] with a touch flex sensor [101], and alternating front-side [105A] and back-side [105B] attached flexible spacer elements; (FIG. 2B) configured for securing within a touch sensor slot [15] formed in the touch button area [11] of the device case [12]; and (FIG. 2C) encased within the touch sensor slot by an elastic insulator material [FIG. 2C, 120].

(FIG. 4A) a touch sensor assembly [100] with a touch flex sensor [101], and alternating front-side [105A] and back-side [105B] attached flexible spacer elements; (FIG. 2B) configured for securing within a touch sensor slot [25] within a touch sensor slot structure [24] integrated with the device case [22] at the touch button area [21]; and (FIG. 4C) encased within the touch sensor slot by an elastic insulator material [FIG. 4C, 220].

DETAILED DESCRIPTION

This Description and the Drawings constitute a Disclosure for apparatus and methods for securing a touch sensor assembly for a touch button within a device, including various technical features and advantages.

In an example application, a touch button apparatus according to the Disclosure can be used to implement one or more touch input/control buttons for a mobile communications device using touch sensing technology, such as with inductive or capacitive sensing. Each touch button is defined at a touch area of the device case (such as on an edge of the case). The touch button apparatus enables installing/securing an associated touch sensor assembly, including a touch sensor (such as a sense inductor coil), within the device case, at the interior side of the touch button area.

In brief overview, an touch button arrangement according to this Disclosure can be used to secure a touch sensor assembly for a device touch button (such as for a mobile communications device). A touch sensor slot integral with the device is disposed at the touch button area. A touch sensor assembly includes a touch flex sensor, and at least three alternating front-side and back-side flexible spacer elements attached to the touch flex sensor. The touch flex sensor can be secured within the touch sensor slot, and spaced from the front-side and back-side slot walls by respectively the front-side and back-side spacer elements. An elastic insulator material is introduced into the touch sensor slot surrounding the touch flex sensor. The sensor slot can be formed in a device wall, or formed by a touch sensor slot structure attached to the device at the touch button area, with an interior surface of the device forming a front-side wall of the touch sensor slot.

Figure 1:
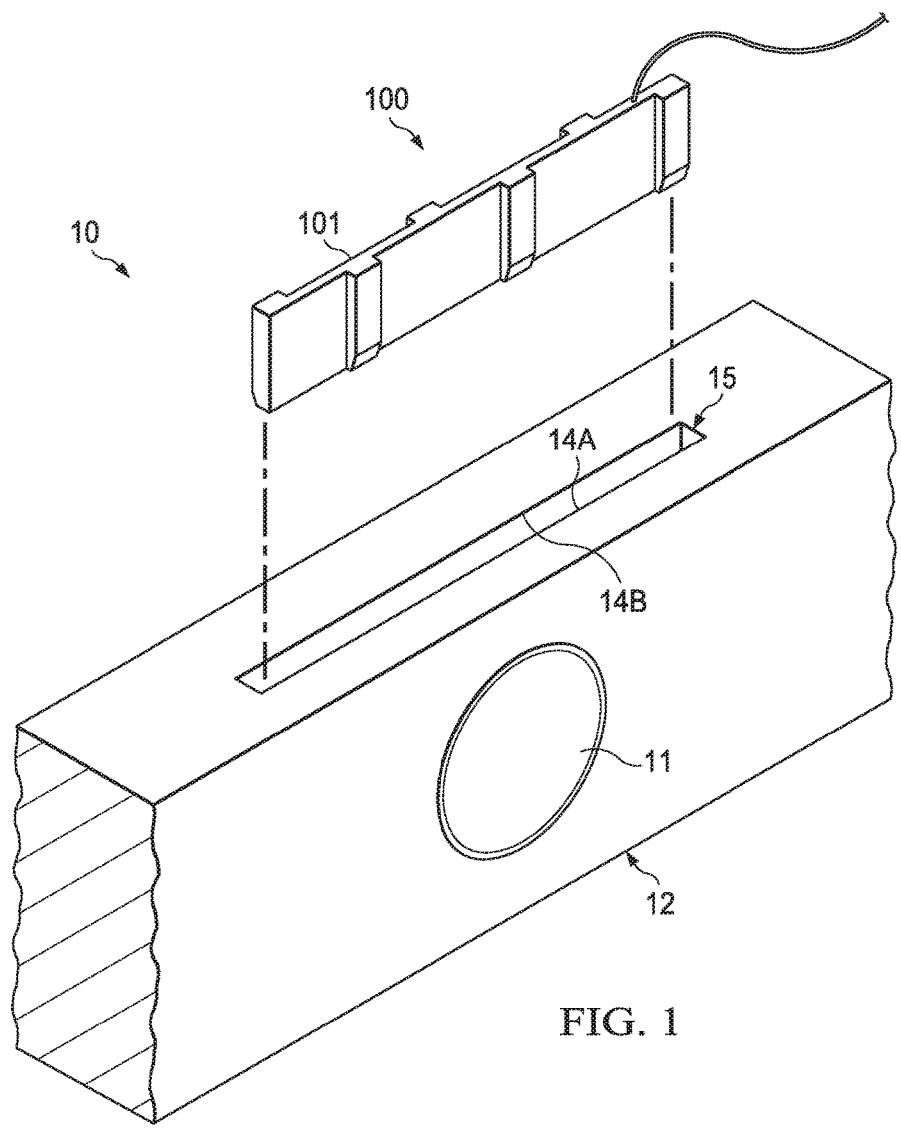
FIGS. 1 and 3 illustrate example mobile communications devices [10, 20] with a touch button [11, 21] defined at a touch button area of the device case [12, 22], and implementing a touch sensor arrangement according to this Disclosure, including a touch sensor assembly [100] with a touch sensor [101] configured for securing within a touch sensor slot [15, 25]

FIG. 1 illustrates example mobile communications device 10 with a touch button 11 defined at a touch button area of the device case 12. A touch sensor arrangement according to this Disclosure includes a touch sensor assembly 100, with a touch sensor 101, configured for securing within a touch sensor slot 15.

Figure 2A:
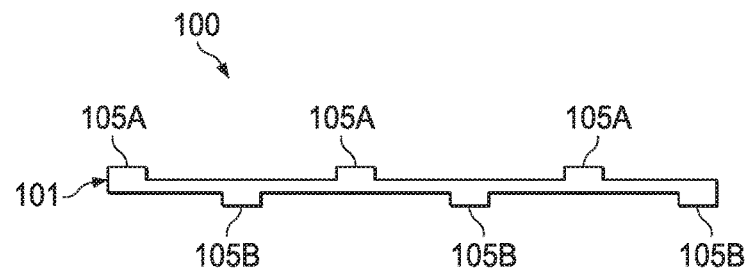
FIGS. 2A-2C illustrate an example touch button apparatus according to this Disclosure, including.
Figure 2B:
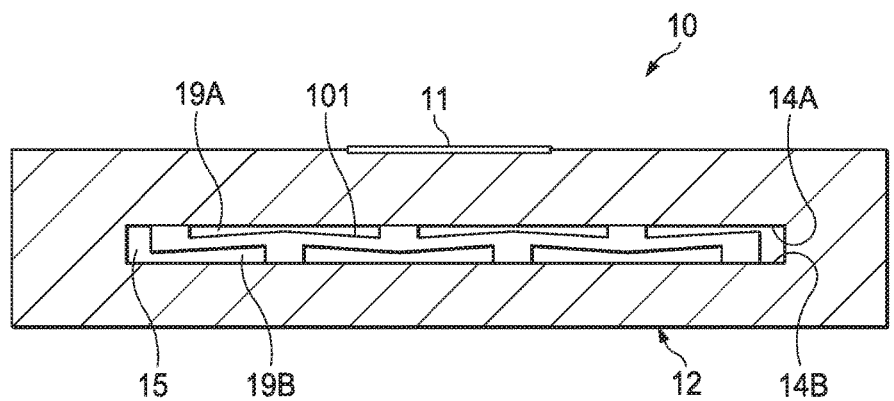
Figure 2C:
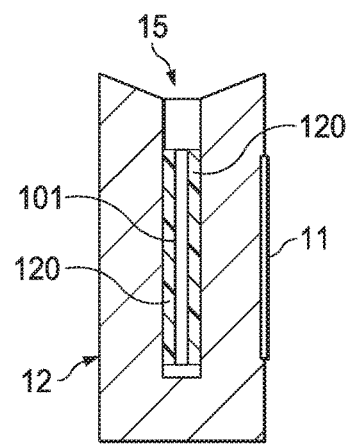

FIGS. 2A-2C illustrate an example touch button arrangement for securing a touch sensor assembly within the device, according to this Disclosure.

FIG. 2A illustrates a touch sensor assembly 100 with a touch flex sensor 101. The touch flex sensor can be implemented with a flexible sensor substrate, incorporating the touch sensor. For example, in the case of inductive sensing, the touch flex sensor can incorporate a sense inductor coil.

Touch sensor assembly 100 includes alternating front-side 105A and back-side 105B flexible spacer elements attached respectively to the front-side and back-side of the touch sensor 101 (for example, a flexible sensor substrate).

FIG. 2B illustrates the example touch sensor assembly 100 inserted within a touch sensor slot 15 formed in the touch button area 11 of the device case 12. Touch sensor slot 15 includes front-side and back-side slot walls 14A and 14B.

The alternating front-side and back-side spacer elements (FIG. 2A, 105A, 105B) secure the touch sensor assembly 100 within touch sensor slot 15. The front-side and back-side spacer elements (FIG. 2A, 105A, 105B) contact respectively the front-side and back-side slot walls 14A and 14B, securing the touch sensor assembly 100 within the touch sensor slot 15 by the alternating arrangement of the front-side and back-side spacer elements.

Touch sensor assembly 100 is secured within the touch sensor slot, with touch flex sensor 101 spaced from the front-side and back-side slot walls 14A and 14B by respectively the front-side and back-side spacer elements (FIG. 2A, 105A, 105B). This spacing results in a front-side sensing gap 19A between the front side of touch flex sensor 101, and the front-side slot wall 14A that is at the interior side of the touch button area 11. This spacing also results in a back-side spacing gap 19B between the back-side of touch flex sensor 101 and the back-side slot wall 14B.

FIG. 2C illustrates completion of installation of the touch sensor assembly 100 within the touch sensor slot by encasing the touch sensor assembly, touch flex sensor 101, within the touch sensor slot by an elastic insulator material 120. Insulator material 120 insulates the touch flex sensor 101 from the front-side and back-side slot walls 14b, while permitting deflection of the front-side slot wall toward the touch flex sensor, for touch-press sensing.

For touch-press sensing, a touch-deflection of the touch button 11 (touch button area) will cause the front-side slot wall 14A to deflect into the touch sensor slot 15, toward the touch flex sensor 101, reducing the distance between the front-side slot wall and the touch flex sensor, i.e. reducing the front-side sensing gap 19A. This reduction in the distance between the front-side slot wall 14A and the touch flex sensor 101, i.e. reducing the front-side sensing gap 19A, can be sensed as a touch-press condition.

Due to the compressibility of the flexible spacer elements and the elastic insulator material, the touch flex sensor 101 will also deflect toward the back-side slot wall 14B (reducing the back-side spacing gap 19B), correspondingly counteracting the reduction in the front-side sensing gap. However, with appropriate design of the touch sensor assembly and touch sensor slot, including the appropriate selection of materials for the flexible spacer elements and the elastic insulator material, a touch-press condition will result in a reduction in the sensing gap 19A that can be sensed.

Figure 3:
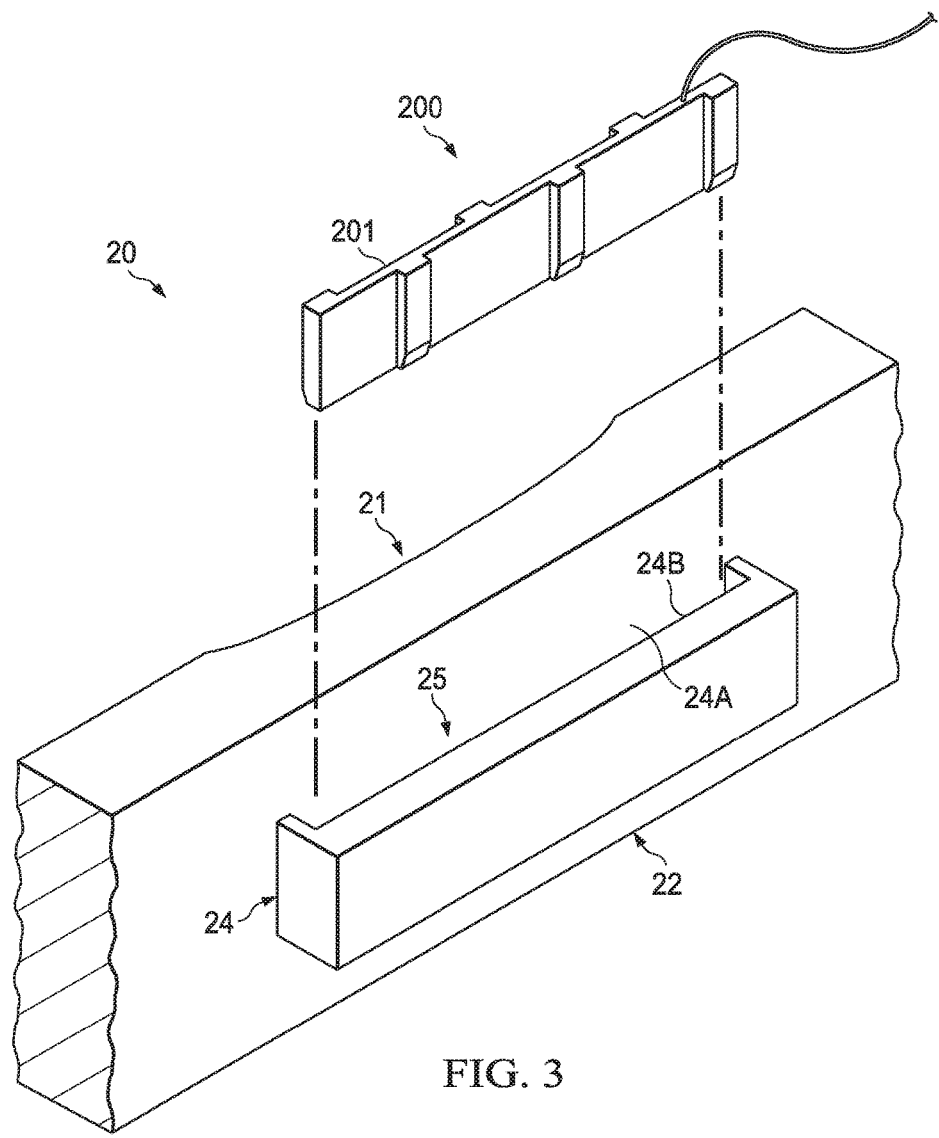

FIG. 3 illustrates example mobile communications device 20 with a touch button 21 defined at a touch button area of the device case 22. A touch sensor arrangement according to this Disclosure includes a touch sensor assembly 100, with a touch sensor 101, configured for securing within a touch sensor slot 25.

Figure 4A:
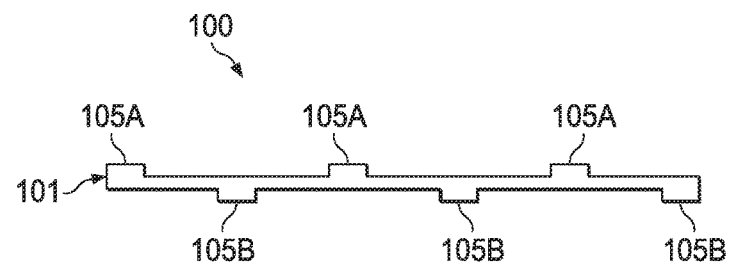
FIGS. 4A-4C illustrate an example touch button apparatus according to this Disclosure, including.
Figure 4B:
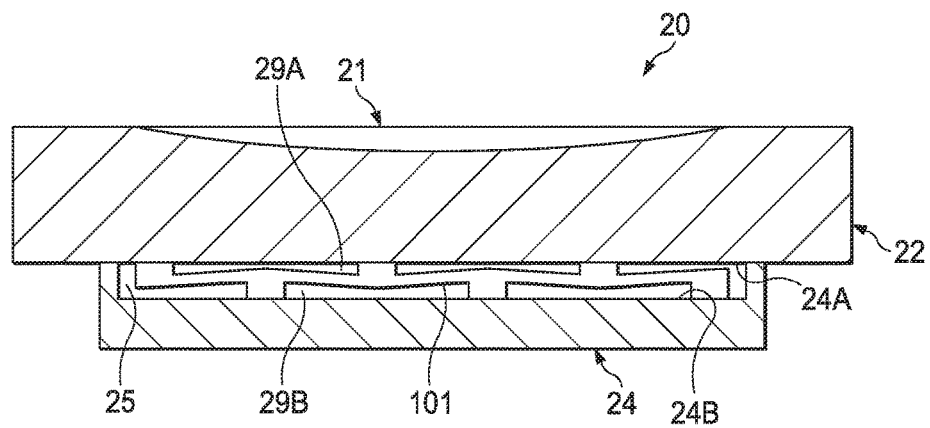
Figure 4C:
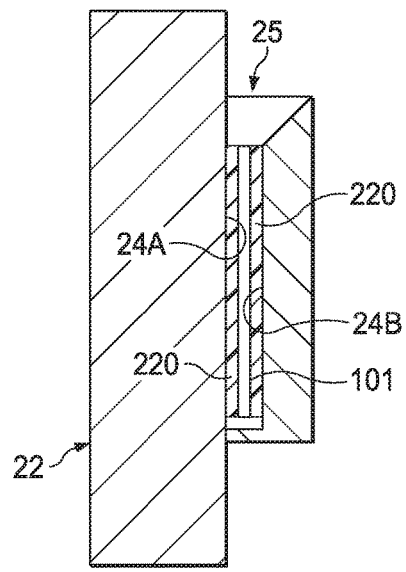

FIGS. 4A-4C illustrate an example touch button arrangement for securing a touch sensor assembly within the device, according to this Disclosure.

FIG. 4A, substantially identical to FIG. 2A, illustrates a touch sensor assembly 100 with a touch flex sensor 101. The touch flex sensor can be implemented with a flexible sensor substrate, incorporating the touch sensor. For example, in the case of inductive sensing, the touch flex sensor can incorporate a sense inductor coil.

Touch sensor assembly 100 includes alternating front-side 105A and back-side 105B flexible spacer elements attached respectively to the front-side and back-side of the touch sensor 101 (for example, a flexible sensor substrate).

FIG. 4B illustrates the example touch sensor assembly 100 inserted within a touch sensor slot 25 formed in a touch sensor slot structure 24, integral with (such as attached to)

the touch button area 21 of the device case 22. Touch sensor slot 15 includes front-side and back-side slot walls 24A and 24B, with the front-side slot wall 24A formed by an interior wall of the touch button area 21.

The alternating front-side and back-side spacer elements (FIG. 4A, 105A, 105B) secure the touch sensor assembly 100 within touch sensor slot 15. The front-side and back-side spacer elements (FIG. 4A, 105A, 105B) contact respectively the front-side and back-side slot walls 24A and 24B, securing the touch sensor assembly 100 within the touch sensor slot 25 by the alternating arrangement of the front-side and back-side spacer elements.

Touch sensor assembly 100 is secured within the touch sensor slot 25, with touch flex sensor 101 spaced from the front-side and back-side slot walls 24A and 24B by respectively the front-side and back-side spacer elements (FIG. 4A, 105A, 105B). This spacing results in a front-side sensing gap 29A between the front side of touch flex sensor 101, and the front-side slot wall 14A that is at the interior side of the touch button area 11. This spacing also results in a back-side spacing gap 29B between the back-side of touch flex sensor 101 and the back-side slot wall 24B.

FIG. 4C illustrates completion of installation of the touch sensor assembly 100 within the touch sensor slot by encasing the touch sensor assembly, touch flex sensor 101, within the touch sensor slot by an elastic insulator material 220. Insulator material 220 insulates the touch flex sensor 101 from the front-side and back-side slot walls 24b, while permitting deflection of the front-side slot wall toward the touch flex sensor, for touch-press sensing.

As with the example implementation of a touch button arrangement of FIGS. 2A-2C, for touch-press sensing, a touch-deflection of the touch button 21 (touch button area) will cause the front-side slot wall 24A to deflect into the touch sensor slot 25, toward the touch flex sensor 101, reducing the distance between the front-side slot wall and the touch flex sensor, i.e. reducing the front-side sensing gap 29A. This reduction in the distance between the front-side slot wall 24A and the touch flex sensor 101, i.e. reducing the front-side sensing gap 29A, can be sensed as a touch-press condition.

Due to the compressibility of the flexible spacer elements and the elastic insulator material, the touch flex sensor 101 will also deflect toward the back-side slot wall 24B (reducing the back-side spacing gap 29B), correspondingly counteracting the reduction in the front-side sensing gap. However, with appropriate design of the touch sensor assembly and touch sensor slot, including the appropriate selection of materials for the flexible spacer elements and the elastic insulator material, a touch-press condition will result in a reduction in the sensing gap 29A that can be sensed.

For the example implementation based on inductive sensing, the sensor electronics can be designed to provide excitation current drive to the sensor inductor coil (creating a projected time varying magnetic sensing field), and to measure a sensor inductor coil characteristic (such as inductance or Q-factor) indicative of the position of the touch button surface (conductive target) relative to the sensor inductor coil, including deflection of the touch button surface toward the sensor inductor coil in response to a button-press condition.

When the touch button apparatus is assembled, the touch sensor assembly is inserted within the touch sensor slot, and secured by the front-side and back-side flexible spacer elements (and the elastic insulator material), in position relative to the touch button area for touch sensing.

Detection of a touch button-press event/condition can be based on any sensing technology capable of detecting deformation of the touch button surface/structure for the particular application and device design. Examples are inductive and capacitive sensing technologies, using respective sensor configurations and electronics. Implementations of touch deformation sensing technology are not part of this Disclosure, and are not described in detail. For example, inductive sensing can be based on detecting button-press deformation of a touch surface/structure, configured as a conductive target, toward a spaced coil inductor, causing a change in coil inductance (i.e., a change in the projected magnetic field of the coil inductor driven by the sensor electronics). And, capacitive sensing can be based on detecting button-press deformation of a touch surface/structure toward a capacitive electrode, causing a change in projected electric field detected as a change in capacitance.

The Disclosure provided by this Description and the Figures sets forth examples and applications illustrating aspects and features of the invention, and does not limit the scope of the invention, which is defined by the claims. Known circuits, connections, functions and operations are not described in detail to avoid obscuring the principles and features of the invention. These examples and applications, can be used by ordinarily skilled artisans as a basis for modifications, substitutions and alternatives to construct other embodiments, including adaptations for other applications.

The invention claimed is:

1. An apparatus for use in a device with at least one touch button defined on a touch button area of the device, the apparatus comprising:
    a touch sensor assembly including
        a touch flex sensor, and
        at least three alternating front-side and back-side spacer elements attached to the touch flex sensor, the spacer elements being flexible;
    a touch sensor slot integral with the device at the touch button area, including front-side and back-side slot walls, to position the touch sensor assembly relative to the touch button area;
    the touch flex sensor secured within the touch sensor slot, and spaced from the front-side and back-side slot walls by respectively the front-side and back-side spacer elements contacting respectively the front-side and back-side slot walls; and
    an elastic insulator material introduced into the touch sensor slot surrounding the touch flex sensor.

2. The apparatus of claim 1, wherein the touch sensor slot is one of:
    a slot formed in the device at the touch button area; or
    a touch sensor slot structure attached to the device at the touch button area, with an interior surface of the device at the touch button area forming a front-side wall of the touch sensor slot.

3. The apparatus of claim 1, wherein the touch flex sensor is a flexible sensor substrate component.

4. The apparatus of claim 1, wherein touch sensing is based on one of inductive and capacitive sensing.

5. The apparatus of claim 4, wherein touch sensing is based on inductive sensing, and the touch flex sensor comprises a flexible sensor substrate component that includes a sense inductor coil.

6. The apparatus of claim 1, wherein the elastic insulator material is silicone rubber.

7. The apparatus of claim 1, wherein the device is a mobile communication device, and the at least one touch button is defined on a side-wall of the device.

8. An apparatus for use in a device with at least one touch button defined on a touch button area of the device, the device including a touch sensor slot integral with the device case at an interior-side of the touch button area, the apparatus comprising:
a touch sensor assembly including
a touch flex sensor, and
at least three alternating front-side and back-side spacer elements attached to the touch flex sensor, the spacer elements being flexible;
the touch sensor assembly configured for positioning within the touch sensor slot, the spacer elements to secure the touch sensor assembly within the touch sensor slot, by the front-side and back-side spacer elements contacting respectively a front-side and a back-side slot wall of the touch sensor slot, the touch flex sensor spaced from the front-side and back-side slot walls by the spacer elements.

9. The apparatus of claim 8, wherein the touch sensor slot is one of:
a slot formed in the device at the touch button area; or
a touch sensor slot structure attached to the device at the touch button area, with an interior surface of the device at the touch button area forming a front-side wall of the touch sensor slot.

10. The apparatus of claim 8, wherein the touch flex sensor is a flexible sensor substrate component.

11. The apparatus of claim 8, wherein touch sensing is based on one of inductive and capacitive sensing.

12. The apparatus of claim 11, wherein touch sensing is based on inductive sensing, and the touch flex sensor comprises a flexible sensor substrate component that includes a sense inductor coil.

13. The apparatus of claim 8, wherein the device is a mobile communication device, and the at least one touch button is defined on a side-wall of the device.

14. A device with at least one touch button defined on a touch button area of the device, comprising:
a device case;
a touch sensor assembly including
a touch flex sensor, and
at least three alternating front-side and back-side spacer elements attached to the touch flex sensor, the spacer elements being flexible;
a touch sensor slot integral with the device case at the touch button area, including front-side and back-side slot walls, to position the touch sensor assembly relative to the touch button area;
the touch flex sensor secured within the touch sensor slot, and spaced from the front-side and back-side slot walls by respectively the front-side and back-side spacer elements contacting respectively the front-side and back-side slot walls; and
an elastic insulator material introduced into the touch sensor slot surrounding the touch flex sensor.

15. The device of claim 14, wherein the touch sensor slot is one of:
a slot formed in the device at the touch button area; or
a touch sensor slot structure attached to the device at the touch button area, with an interior surface of the device at the touch button area forming a front-side wall of the touch sensor slot.

16. The device of claim 14, wherein the touch flex sensor is a flexible sensor substrate component.

17. The device of claim 14, wherein touch sensing is based on one of inductive and capacitive sensing.

18. The device of claim 17, wherein touch sensing is based on inductive sensing, and the touch flex sensor comprises a flexible sensor substrate component that includes a sense inductor coil.

19. The device of claim 14, wherein the elastic insulator material is silicone rubber.

20. The device of claim 14, wherein the device is a mobile communication device, and the at least one touch button is defined on a side-wall of the device.

* * * * *